United States Patent
Umesh et al.

(10) Patent No.: US 9,288,144 B2
(45) Date of Patent: Mar. 15, 2016

(54) SCALABLE AND PREDICTIVE PACKET PROCESSING

(71) Applicant: Broadcom Corporation, Irvine, CA (US)

(72) Inventors: Santhosh Umesh, Bangalore (IN); Tarun Kumar Varshney, Bangalore (IN); Vijay Anand Purushothaman, Bangalore (IN); Mohan Kalkunte, Saratoga, CA (US); Santosh Kalluthirike Janardhan, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 50 days.

(21) Appl. No.: 14/092,789

(22) Filed: Nov. 27, 2013

(65) Prior Publication Data

US 2015/0117455 A1    Apr. 30, 2015

Related U.S. Application Data

(60) Provisional application No. 61/896,524, filed on Oct. 28, 2013.

(51) Int. Cl.
   *H04L 12/861*    (2013.01)
   *H04L 12/721*    (2013.01)
   *H04L 12/747*    (2013.01)

(52) U.S. Cl.
   CPC .............. *H04L 45/38* (2013.01); *H04L 45/742* (2013.01)

(58) Field of Classification Search
   None
   See application file for complete search history.

(56) References Cited

U.S. PATENT DOCUMENTS

| | | | |
|---|---|---|---|
| 5,313,454 A * | 5/1994 | Bustini et al. | 370/231 |
| 6,055,619 A * | 4/2000 | North et al. | 712/36 |
| 8,300,532 B1 * | 10/2012 | Venkatramani | H04L 45/306 370/235 |
| 2008/0113615 A1 * | 5/2008 | Fahldieck | 455/7 |
| 2012/0207169 A1 * | 8/2012 | Parker et al. | 370/395.53 |
| 2013/0215836 A1 * | 8/2013 | Quan et al. | 370/329 |
| 2014/0372616 A1 * | 12/2014 | Arisoylu et al. | 709/226 |
| 2015/0043589 A1 * | 2/2015 | Han et al. | 370/392 |

* cited by examiner

*Primary Examiner* — Omar Ghowrwal
(74) *Attorney, Agent, or Firm* — McDermott Will & Emery LLP

(57) ABSTRACT

A system for scalable and predictive packet processing may include a memory and a processor. The memory may be configured to store packet processing results performed on a packet. The processor may be configured to apply the stored packet processing results to subsequently received packets that have the same flow identifier as the processed packet without performing ingress packet processing on the subsequent packets.

22 Claims, 9 Drawing Sheets

| INDEX (PER PORT) | VALID | COUNT VALUE | PACKET FORWARDING INFORMATION | PACKET EDIT INFORMATION |
|---|---|---|---|---|
| | | | | |
| | | | | |
| | | | | |

802　804　806　808　810

800

FIG. 8

SCALABLE AND PREDICTIVE PACKET PROCESSING

CROSS-REFERENCE TO RELATED APPLICATIONS

The present application claims the benefit of priority under 35 U.S.C. §119 from U.S. Provisional Patent Application Ser. No. 61/896,524, filed on Oct. 28, 2013, the disclosure of which is hereby incorporated by reference in its entirety for all purposes.

TECHNICAL FIELD

The present description relates generally to packet processing and, in particular, relates to scalable and predictive packet processing.

BACKGROUND

Networking infrastructures are facing ever increasing demands for increased bandwidth and intelligent services for a rapidly growing number of users. Efficient power consumption is also of concern. Network switch devices that handle these user interactions, such as switches and routers, spend significant processing time performing lookups and accessing memories for every packet that is processed. For example, each packet may follow a process where 1) the packets ingress into the switch device; 2) various parameters of the packet are parsed; 3) classification is performed using tables, registers and/or fields to derive forwarding information; and 4) packet modification actions are derived, such as packet forward or drop action. Thus, each packet is independently processed and there is no correlation between similar packets. As network traffic through the switch device increases, the packet processing overhead correspondingly increases. Additional processors and memory may be added to handle the increased demands, but may add cost to the switch device and may also consume real estate and power.

BRIEF DESCRIPTION OF THE DRAWINGS

Certain features of the subject technology are set forth in the appended claims. However, for purpose of explanation, several embodiments of the subject technology are set forth in the following figures.

FIG. 8 illustrates an example packet processing results table of a system for scalable and predictive packet processing in accordance with one or more implementations.

DETAILED DESCRIPTION

Figure 1:
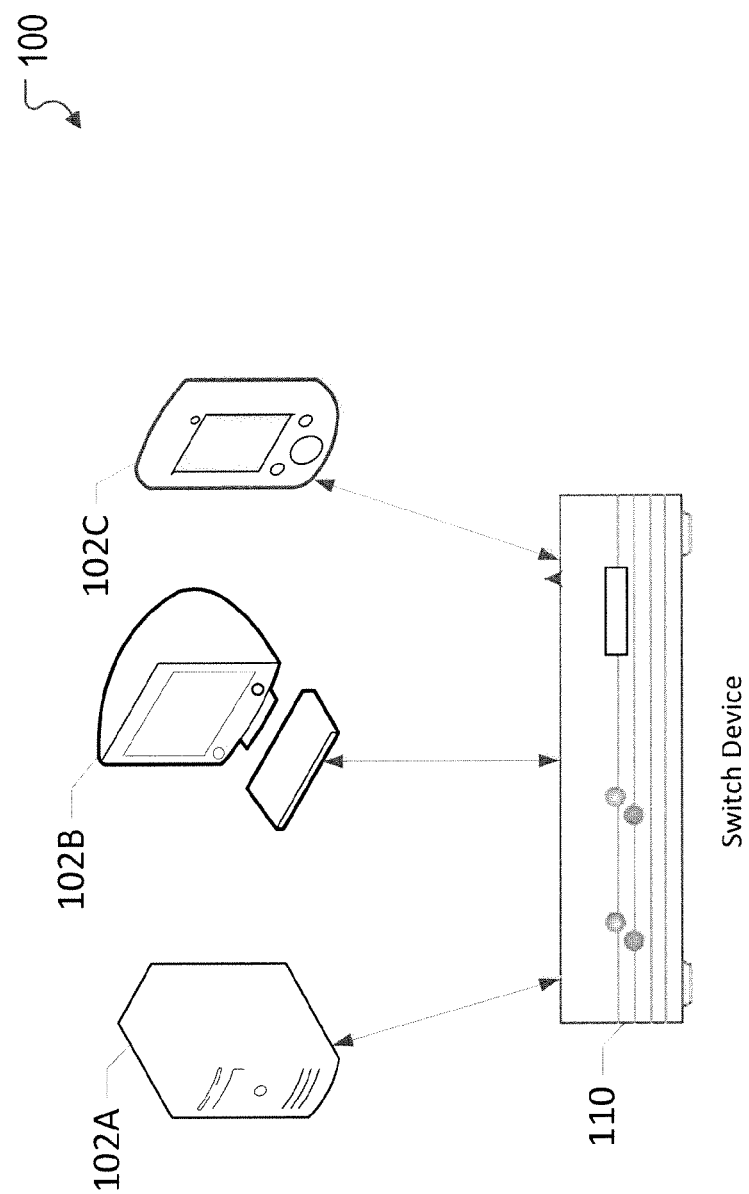
FIG. 1 illustrates an example network environment in which a system for scalable and predictive packet processing may be implemented in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject system for providing scalable and predictive packet processing in switch devices, a process is used to correlate packets that require similar processing so that the processing results such as forwarding information or packet edit information derived for a first packet may be used for additional following packets. Accordingly, each packet in the network is tagged with a predictive packet processing (PPP) tag that may be an 8-byte tag. When a switch device receives multiple packets (e.g., a burst), the switch device may provide packet processing on the first packet to determine what type of packet action should be performed on the first packet (e.g., forward, edit) and perform the packet action on the first packet. The same packet action may be performed on subsequent packets in the packet stream or burst that have the same PPP identification information as the first packet without performing packet processing on the subsequent packets.

For example, in a typical packet processing architecture, forwarding information may be derived based on Layer-3 header fields such as destination internet protocol address (DIP) and source internet protocol address (SIP). Here, a forwarding lookup is performed on each and every incoming packet entering the system regardless of lookup fields of the packets. For example, if X nanoseconds (ns) are spent on processing a packet (e.g., parse, lookup, action) having lookup fields {SIP1, DIP1}, 10 similar packets having the same lookup fields {SIP1, DIP1} would consume 10×ns of processing time to determine the same processing results for each packet. As the number of packets to be processed having the same lookup fields increases, the amount of time spent on redundant processing of the packets increases correspondingly.

However, by using predictive packet processing to correlate packets that require similar processing, the results of packet processing (e.g., forwarding, editing) performed on the first similar packet can be leveraged on subsequent similar packets. Continuing the above example, if X ns are spent on processing the first packet having lookup fields {SIP1, DIP1}, each of the subsequent 9 packets having the same lookup fields {SIP1, DIP1} use only a fraction of the X ns (e.g., Y ns) processing time spent on the first packet. For example, if $Y=(\frac{1}{3})X$, then the total processing time for all 10 packets using PPP is 4×ns, as opposed to the 10×ns required in the typical process, yielding a 60% reduction in latency for processing 10 packets. If the total number of similar packets is 100, then the total processing time for all 100 packets using PPP is 34×ns, yielding a 66% reduction in latency for processing 100 packets.

In accordance with one or more implementations of the subject system, the switch device may have multiple non-dedicated system ports able to accommodate an interleaved burst of frames. Here, the PPP tag includes a 16 bit PPP ether-type field used as a signature match to enable predictive packet processing. The PPP tag also includes a 32 bit flow-ID field that holds information classifying packet flow requiring the same packet processing. For example, the flow-ID may identify individual applications, virtual machines, physical servers and the like. The PPP tag further includes a 16 bit reserved field for future extension. In practice, the memory of the switch device may be indexed based on the flow-ID to save packet processing results (e.g., L2/L3 forwarding, CPU processing, QoS attributes, buffering information, custom packet edits) to be attributed to subsequent packets with the same flow-ID.

In accordance with one or more implementations of the subject system, communication may occur between two adjacent systems over a dedicated link in a network (e.g., point to point applications) for which packets arrive in a burst without any interleave. Here, the PPP tag again includes a 16 bit PPP ether-type used as a signature match to enable predictive packet processing. The PPP tag also includes a 32 bit count value field that holds burst size information (e.g., the number of packets for which the same predictive processing is enabled). The PPP tag further includes a 1 bit count reset field signifying whether the per-port count value needs to be reset. For example, the count reset field may flag the start of a new burst of frames. The PPP tag also includes a 15 bit reserved field for future extension.

FIG. 1 illustrates an example network environment 100 in which a system for scalable and predictive packet processing may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 may include various electronic devices 102A-C such as one or more servers, computers, network components, network devices, etc. In one or more implementations, one or more of the electronic devices 102A-C may represent a set of servers, a server bank, or a vast network of interconnected computers or network devices. In one or more implementations, the network environment 100 may include one or more other devices, such as, for example, one or more wireless telephone, mobile device or mobile phone, smart phone, communications device, tablet, personal computer (PC), set-top box (STB), personal digital assistant (PDA), palmtop computer, laptop computer, desktop computer, land-line telephone, control system, camera, scanner, facsimile machine, printer, pager, personal trusted device, web appliance, network router, switch or bridge, or any other machine or device.

One or more network devices, such as the network device 110, may be implemented to facilitate communication between the one or more electronic devices 102A-C of the network environment 100. The electronic devices 102A-C of the network environment 100, may be connected or otherwise in communication with each other, through or using the network device 110. For example, the electronic devices 102A-C may each be coupled to a physical port of the network device 110 by a network transmission line, such as an Ethernet transmission line, a coaxial transmission line, an optical transmission line, or generally any transmission line. In one or more implementations, one or more of the electronic devices 102A-C may be wirelessly coupled to the network device 110.

The network device 110 may be a switch device, routing device, such as any layer 3 routing device, or generally any network device that routes data, such as packets. The network device 110 may include one or more memory modules that store a packet processing table. The packet processing table may include an index based on flow identification (Flow-ID) of a packet (e.g., internal, external) and packet processing results from a first packet in a burst. Packet processing results may include packet forwarding information, packet editing information, layer forwarding (e.g., L2/L3 forwarding), centralized processing unit (CPU) processing, quality of service (QoS) attributes, buffering information, and custom packet edits. The packet processing table may include a count value. Example packet processing tables are discussed further below with respect to FIGS. 5 and 8, and an example network device 110 is discussed further below with respect to FIG. 2. The network device 110 and/or one or more of the electronic devices 102A-C, may be, or may include one or more components of, the electronic system discussed below with respect to FIG. 9.

The electronic devices 102A-C transmit packets to the network device 110. The packets may each include packet processing information. For example, headers of the packets may include a PPP tag having a PPP ether-type field and a Flow-ID or count value field. The network device 110 receives the packets, determines if there is a signature match for enabling predictive packet processing, validates a Flow-ID lookup, and takes action on the packets (e.g., forwarding, editing) based at least on the Flow-ID lookup.

In one or more implementations, the scalable and predictive packet processing system may accommodate interleaved bursts of packets or frames on any of the system ports (e.g., no dedicated port required) by tagging every packet in the network with a PPP tag. For example, the PPP tag may include a PPP ether type field, a Flow-ID field and a reserved field to identify packets requiring the same processing. An example packet format for systems not using an interleaved packet approach is discussed further below with respect to FIG. 4 and an example process for the corresponding packet processing is discussed further below with respect to FIG. 3.

In one or more implementations, the scalable and predictive packet processing system may accommodate communications between adjacent systems over a dedicated link in a network by tagging every packet initiated on the dedicated link with a PPP tag. Here, packets may arrive in a burst without any interleave. For example, the PPP tag may include a PPP ether type field, a count value field, a count reset field and a reserved field to identify packets requiring the same processing. An example packet format for systems using a dedicated link or port is discussed further below with respect to FIG. 7 and an example process for the corresponding packet processing is discussed further below with respect to FIG. 6.

In one or more implementations, the scalable and predictive packet processing system or architecture may be applied across networks, such as SONET/SDH, Ethernet and Fiber Channel networks, for example. In one or more implementations, the scalable and predictive packet processing system or architecture may include network specific processors and/or general processors implementing network functions.

In operation, the network device 110 performs a detailed lookup and corresponding packet processing on a first packet, storing the results of the packet processing of the first packet in the network device 110. The network device 110 may determine each subsequent incoming packet matching the packet processing needs of the first packet and apply the saved packet processing results from the first packet without having to undertake a detailed lookup or key-match logic on the subsequent matched packets. For example, the network device 110 may use the PPP ether-type field of the PPP tag of each subsequent packet as a signature match for predictive packet processing to be enabled for that subsequent packet.

Figure 2:
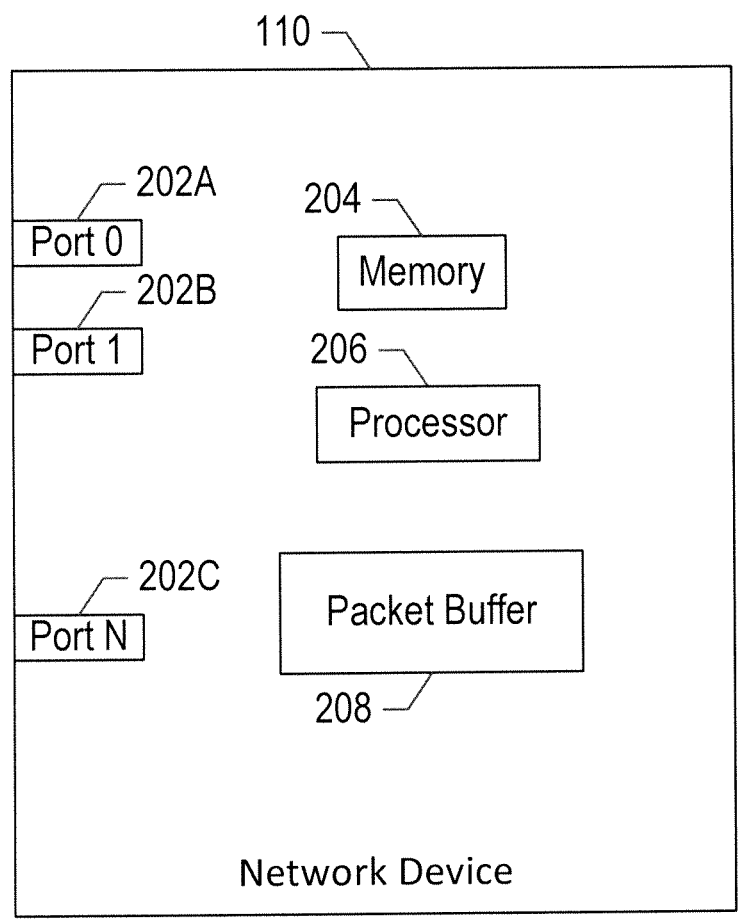
FIG. 2 illustrates an example network device that may implement a system for scalable and predictive packet processing in accordance with one or more implementations.

FIG. 2 illustrates an example network device 110 that may implement a system for scalable and predictive packet processing in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The network device 110 includes ports 202A-C, a memory 204, a processor 206, and a packet buffer 208. The memory 204 may store the packet processing results table for the network device 110. For explanatory purposes, the memory 204 is illustrated as a single block; however, the memory 204 may include one or more disparate memory modules and/or different types of memory modules, such as TCAM, random access memory (RAM), static random-access memory (SRAM), dynamic random-access memory (DRAM), double data rate synchronous dynamic random-access memory (DDR SDRAM). In one or more implementations, the entire routing table may be stored in one type of memory, such as SRAM. In one or more implementations, portions of the packet processing results table may be stored in different types of memory. For example, packet forwarding information may be stored in SRAM, while packet edit information may be stored in TCAM. Thus, the packet forwarding information may include pointers to the packet edit information stored in TCAM.

In one or more implementations, the processor 206 may be a network processor, such as a packet processor, and may be, or may include, a forwarding engine. In one or more implementations, the processor 206, or a portion thereof, may be implemented in software (e.g., subroutines and code). In one or more implementations, the processor 206, or a portion thereof, may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

The ports 202A-C may be physical ports over which packets are received and transmitted (e.g., from/to electronic devices 102A-C). The packet buffer 208 may be one or more types of memory, such as DRAM, that store packets that are received/transmitted over the physical ports. In one or more implementations, a packet may be received over one of the ports 202A-C (e.g., the port 202A). The packet may be queued in the packet buffer 208 (e.g., in an ingress queue) for processing by the processor 206. The processor 206 may retrieve the packet, and/or a header thereof, from the packet buffer 208 and may determine (e.g., based on the packet processing results stored in the memory 204) the packet processing required for the packet (e.g., forwarding the packet). The processor 206 may then queue the packet in a queue associated with a port (e.g., port 202B) and the packet may be subsequently retrieved from the packet buffer 208 and transmitted over port 202B.

Figure 3:
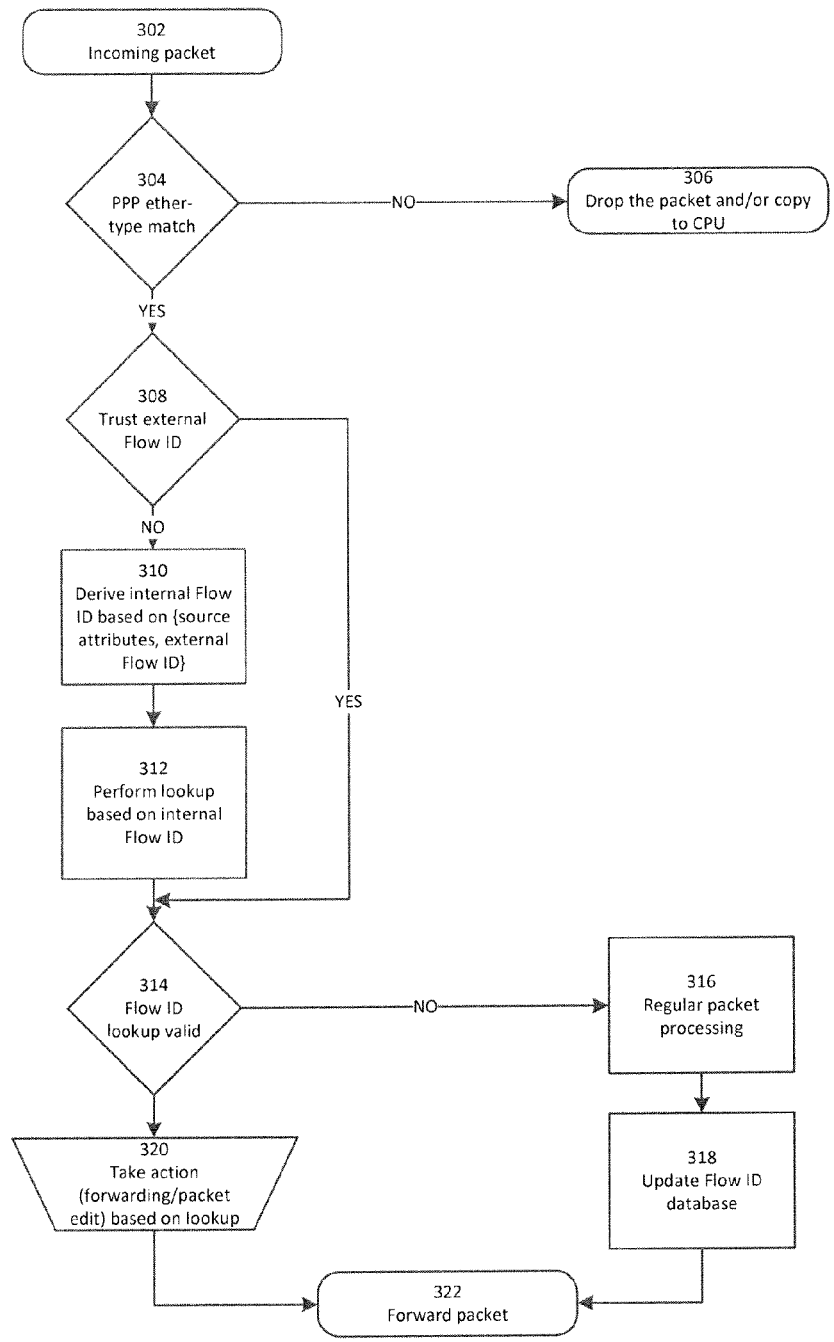
FIG. 3 illustrates a flow diagram of an example process for determining a packet action in a system for scalable and predictive packet processing in accordance with one or more implementations.

FIG. 3 illustrates a flow diagram of an example process 300 for processing an incoming packet in a system for scalable and predictive packet processing in accordance with one or more implementations. For explanatory purposes, the example process 300 is described herein with reference to the network device 110 of FIGS. 1 and 2. However, the example process 300 is not limited to the network device 110 of FIGS. 1 and 2, and the example process 300 may be performed by one or more components of the network device 110. Further for explanatory purposes, the blocks of the example process 300 are described herein as occurring in serial, or linearly. However, multiple blocks of the example process 300 may occur in parallel. In addition, the blocks of the example process 300 need not be performed in the order shown and/or one or more of the blocks of the example process 300 need not be performed.

The processor 206 of the network device 110 receives an incoming packet (302). The processor looks at the PPP tag of the incoming packet to determine if there is a signature match to enable PPP (304). For example, the processor 206 may process the header of the packet to retrieve the PPP ether-type field. If the PPP ether-type field does not provide a match, the processor 206 may drop the packet and/or copy the packet to a CPU (306). If the PPP ether-type field does provide a match, the processor 206 may determine whether to trust the external Flow-ID of the packet (308).

If the processor 206 determines not to trust the external Flow-ID, the processor 206 may derive an internal Flow-ID based on {Source Attributes, External Flow-ID} (310). The processor 206 may perform a lookup based on the determined internal Flow-ID (312). If the processor 206 determines to trust the external Flow-ID, the processor 206 may bypass deriving an internal Flow-ID (310) and performing a lookup based on the internal Flow-ID (312). In either case (e.g., the trusted external Flow-ID or the internal Flow-ID lookup), the processor 206 may determine if the Flow-ID lookup is valid (314). If the Flow-ID is determined to not be valid, the processor 206 may perform regular packet processing (e.g., forwarding, editing) on the packet (316). The processor 206 may update a Flow-ID database in memory 204 with packet processing results (318). For example, packet processing results may include any of packet forwarding information, packet editing information, L2/L3 forwarding, CPU processing, QoS attributes, buffering information, and custom packet edits, which may be associated with the updated Flow-ID in the database.

If the Flow-ID is determined to be valid, the processor 206 may perform a packet action based on the Flow-ID lookup (320). For example, the processor 206 may forward the packet if the packet processing results associated with the Flow-ID lookup is to forward the packet. Similarly, if the packet processing results associated with the Flow-ID lookup is to edit the packet in a particular way, the processor 206 will edit the present packet in the corresponding way. If the regular packet processing (316) or the packet action (320) did not already result in forwarding the packet, the processor 206 forwards the processed packet (322). For example, the packet may be forwarded out of an egress port to another device in the network environment 100.

Figure 4:
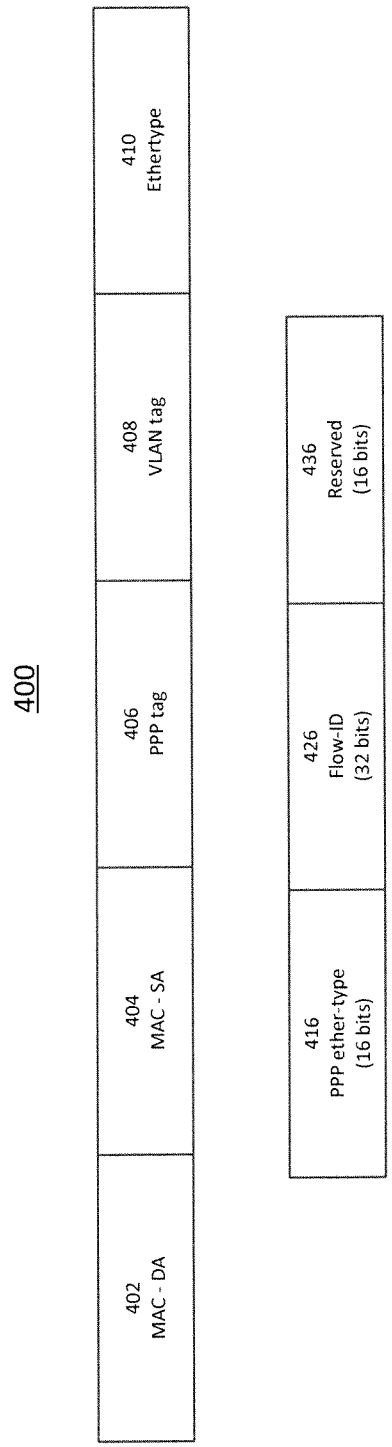
FIG. 4 illustrates an example packet format for scalable and predictive packet processing in accordance with one or more implementations.

FIG. 4 illustrates a packet format 400 of a system for scalable and predictive packet processing in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example packet format 400 includes a MAC-DA header 402, a MAC-SA header 404, a PPP tag 406, a VLAN tag 408 and an Ethertype header 410. The PPP tag includes a 16 bit PPP ether-type field 416, a 32 bit Flow-ID field 426 and a 16 bit reserved field 436. In operation, the processor 206 uses the PPP ether-type field to determine a signature match to enable predictive packet processing. In operation, the processor 206 uses the Flow-ID field to determine if a packet requires the same packet processing as a previously processed packet having the same Flow-ID. For example, the Flow-ID may identify individual applications, virtual machines and physical servers. Thus, the Flow-ID can be derived based on attributes associated with the identified individual applications, virtual machines and physical servers.

Figure 5:
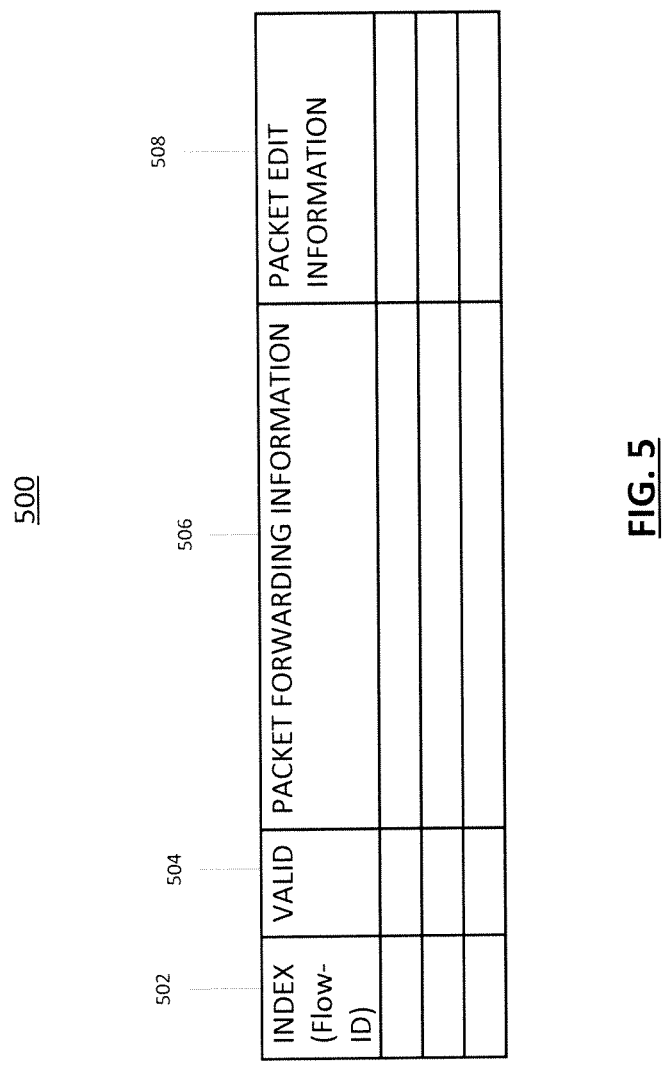
FIG. 5 illustrates an example packet processing results table of a system for scalable and predictive packet processing in accordance with one or more implementations.

FIG. 5 illustrates an example packet processing results table 500 of a system for scalable and predictive packet processing in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The packet processing results table 500 includes indexes 502, validity indicators 504, packet forwarding information 506 and packet edit information 508. The index 502 may be per Flow-ID. The packet forwarding information 506 may provide the packet addressing to which a previous packet having the same Flow-ID was forwarded. The packet edit information 508 may provide the particular packet editing processes that were performed on a previous packet having the same Flow-ID. For example, the processor 206 may use either the packet forwarding information 506 or the packet edit information 508 to perform a packet action on the current packet after determining that the current packet Flow-ID matches the Flow-ID of a previously processed packet associated with the packet forwarding information 506 or the packet edit information 508.

In one or more implementations, each entry of the packet processing results table 500 in memory 204 may be aged out after a fixed period of time if the flow is not active. Once the flow becomes active again, predictive packet processing may resume. In one or more implementations, the PPP Flow-ID may be derived externally using another device, such as a field programmable gate array (FPGA), for example.

As an example of one or more implementations, a datacenter may have Port Extender (e.g., IEEE 802.1 BR) functionality enabled. The datacenter may have physical servers with virtual machines (VMs) connected to port extenders (PEs) which may be connected to a controlling bridge (CB). Predictive packet processing may be enabled for individual applications to provide application aware networking as follows.

An end application (e.g., TCP/IP) may request a VM/hypervisor to provide a predictive packet processing feature. The VM/hypervisor may use a PE tag VID+application handler to identify the application flow, which may be used as a Flow-ID for PPP. The application handler, and therefore the Flow-ID is unique for each application running in a VM. The VM may insert the Flow-ID into all packets coming from the specified application by either using the PPP ether-type field or by overlaying the Flow-ID on the unused S-VID field in a PE tag in the uplink direction. The PEs may forward the packet as defined in the PE standard. The CB may receive the packet and use the Flow-ID in the packet and namespace (e.g., each CB port) to derive an internal Flow-ID. The Flow-ID and namespace combination is unique for a specified application.

All switches and/or bridges in the path may apply PPP to this flow in a similar manner. In case of VM movement, the individual VM may de-register the PE tag VID using the datacenter bridging capability (e.g., DCBX) protocol (e.g., delete, disable, set commands). Thus, all databases including all Flow-IDs associated with the de-registered PE tag VID may be cleared by the CBs. The transferred or moved VM may register again using DCBX protocol and having a new PE tag VID assigned. Each application running on the VM may follow the above process, which may be applied to any unicast and/or multicast flows.

In one or more implementations, predictive packet processing may be deployed in a software defined network (SDN) and a network function virtualization (NFV) enabled network. In any of the environments discussed above, predictive packet processing may provide a system that dynamically adapts itself based on the incoming packet flow, providing scalability and flexibility in system/network design and operations.

Figure 6:
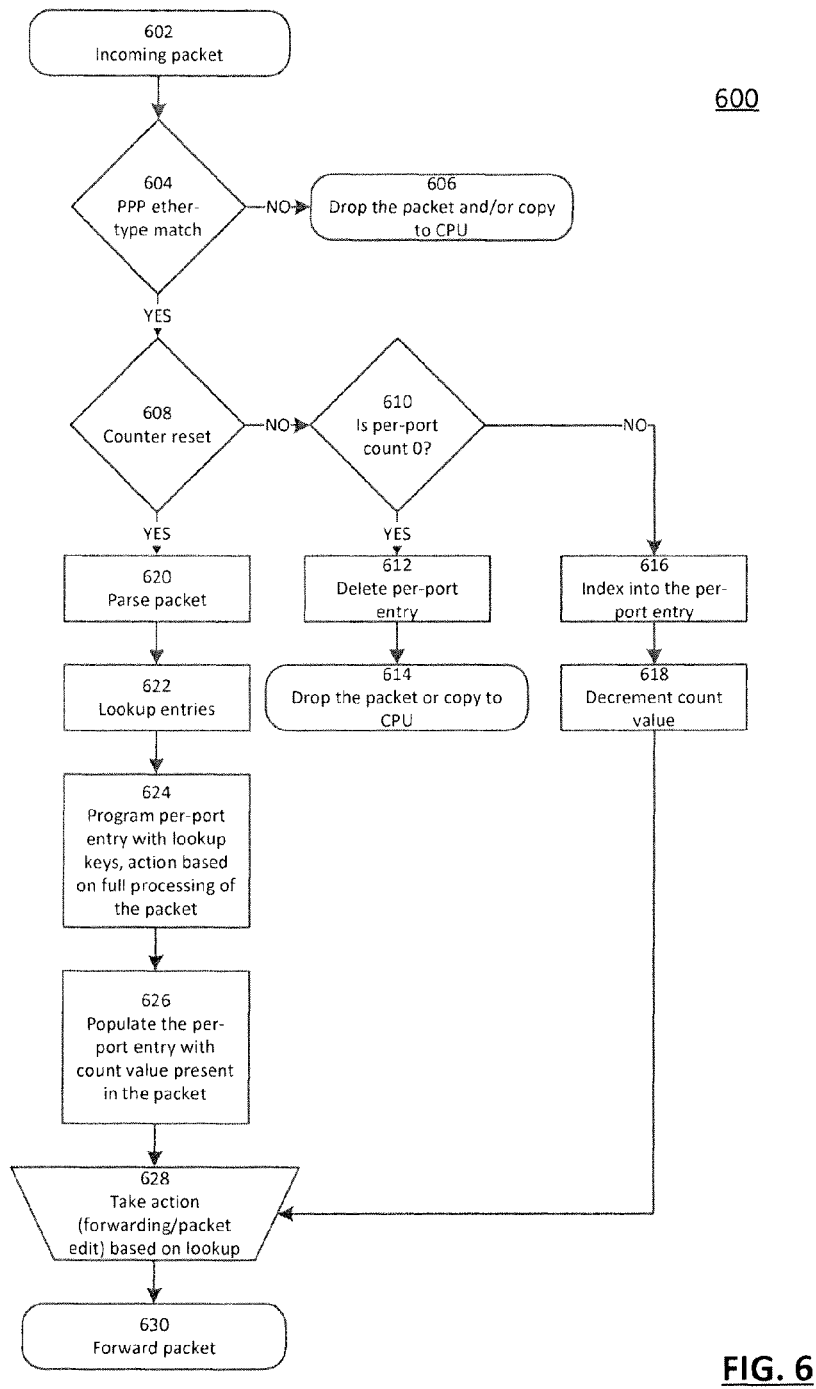
FIG. 6 illustrates a flow diagram of an example process for determining a packet action in a system for scalable and predictive packet processing in accordance with one or more implementations.

FIG. 6 illustrates a flow diagram of an example process 600 for processing an incoming packet in a system for scalable and predictive packet processing in accordance with one or more implementations. For explanatory purposes, the example process 600 is described herein with reference to the network device 110 of FIGS. 1 and 2. However, the example process 600 is not limited to the network device 110 of FIGS. 1 and 2, and the example process 600 may be performed by one or more components of the network device 110. Further for explanatory purposes, the blocks of the example process 600 are described herein as occurring in serial, or linearly. However, multiple blocks of the example process 600 may occur in parallel. In addition, the blocks of the example process 600 need not be performed in the order shown and/or one or more of the blocks of the example process 600 need not be performed.

The processor 206 of the network device 110 receives an incoming packet (602). The processor looks at the PPP tag of the incoming packet to determine if there is a signature match to enable PPP (604). For example, the processor 206 may process the header of the packet to retrieve the PPP ether-type field. If the PPP ether-type field does not provide a match, the processor 206 may drop the packet and/or copy the packet to a CPU (606). If the PPP ether-type field does provide a match, the processor 206 may determine whether a counter has been reset (608).

If the processor 206 determines there is no counter reset, the processor 206 may determine if a per-port count equals zero (610). If the processor 206 determines the per-port count equals zero (312), the processor 206 may drop the packet and/or copy the packet to a CPU (614). If the processor 206 determines the per-port count is not equal to zero (616), the processor 206 may decrement the count value (618).

If the processor 206 determines that there is a counter reset, the processor 206 may parse the packet (620) and determine lookup entries (622). The processor 206 may program a per-port entry with lookup keys based on full processing of the packet (624). The processor 206 may populate the per-port entry with a count value present in the packet (626). The processor 206 may take action on the packet (628) based on either the decremented count value (618) or the count value present in the packet (626), such as forwarding the packet or editing the packet. If the packet action (628) did not already result in forwarding the packet, the processor 206 may forward the packet (630).

Figure 7:
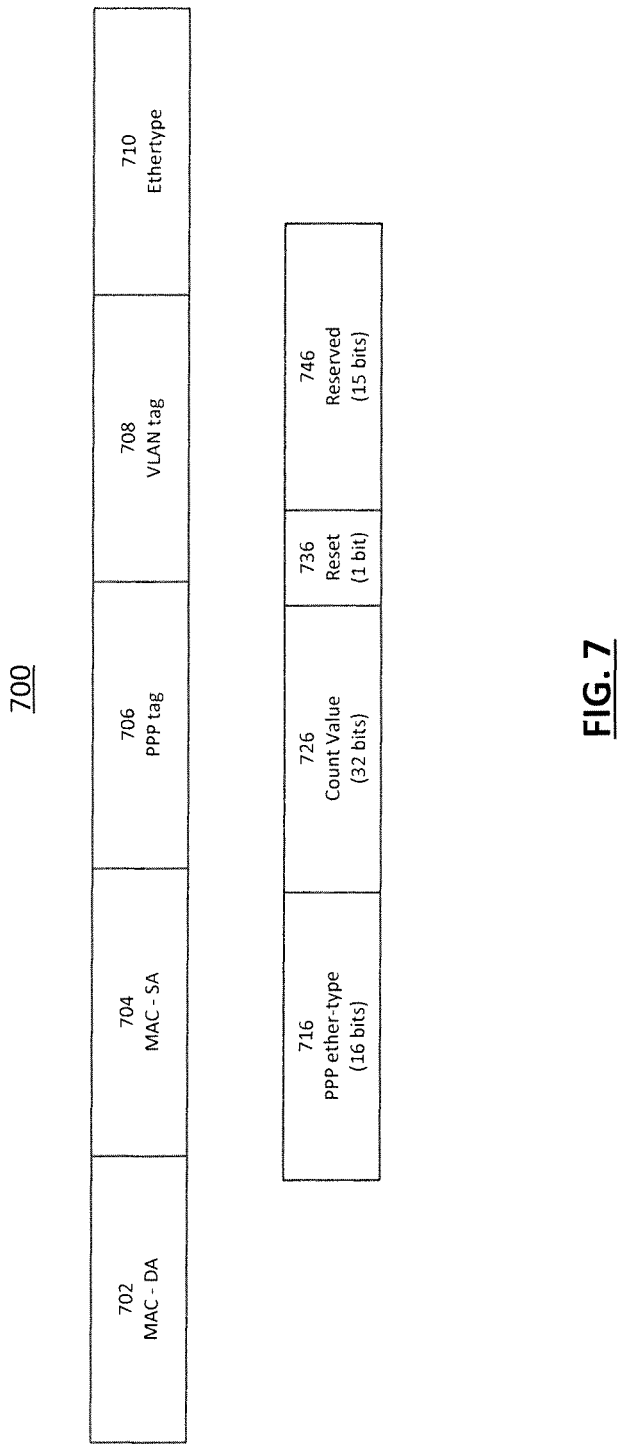
FIG. 7 illustrates an example packet format for scalable and predictive packet processing in accordance with one or more implementations.

FIG. 7 illustrates a packet format 700 of a system for scalable and predictive packet processing in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example packet format 700 includes a MAC-DA header 702, a MAC-SA header 704, a PPP tag 706, a VLAN tag 708 and an Ethertype header 710. The PPP tag includes a 16 bit PPP ether-type field 716, a 32 bit Count Value field 726, a one bit Count Reset field 736 and a 16 bit reserved field 746. In operation, the processor 206 uses the PPP ether-type field to determine a signature match to enable predictive packet processing. In operation, the processor 206 uses the Count Value field 726 to determine the burst size information, which may include the number of packets for which the same predictive processing is enabled. The Count Reset field 736 may be used by the processor 206 to determine if the per-port count value and corresponding entry need to be reset. For example, the Count Reset field 736 may flag the start of a new burst of frames where a packet with a count reset equals one may be fully processed. In one or more implementations, the count reset may be a hard reset and the per-port count value may not have to be zero for a reset to take place.

FIG. 8 illustrates an example packet processing results table 800 of a system for scalable and predictive packet processing in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The packet processing results table 800 includes indexes 802, validity indicators 804, count values 806, packet forwarding information 808 and packet edit information 810. The index 802 may be per port. The packet forwarding information 808 may provide the packet addressing to which a previous packet having the same Flow-ID was forwarded. The packet edit information 810 may provide the particular packet editing processes that were performed on a previous packet having the same Flow-ID. For example, the processor 206 may use either the packet forwarding information 808 or the packet edit information 810 to perform a packet action on the current packet after determining that the count value 806 matches the count value 806 of a previously processed packet. In one or more implementations, each entry of the packet processing results table 800 in memory 204 may be aged out after a fixed period of time if the dedicated link is not active. Once the dedicated link becomes active again, predictive packet processing may resume.

As an example of one or more implementations, there may be a burst of 100 frames that require predictive packet processing. Here the first packet may have a Count Reset value of 1 and be fully processed, after which the Count Value may be decremented to 99. Each successive packet from 2 through 99 may have a Count Reset value of 0 and undergo predictive packet processing instead of full packet processing, thereby drastically reducing the processing and latency times for processing the entire 100 packet burst.

In one or more implementations, the PPP tag 706 may include additional information, such as a Byte Count and a Time Interval, for example. Additional parameters may act as guidelines for the system to predictively apply actions for the next set of incoming packets.

Figure 9:
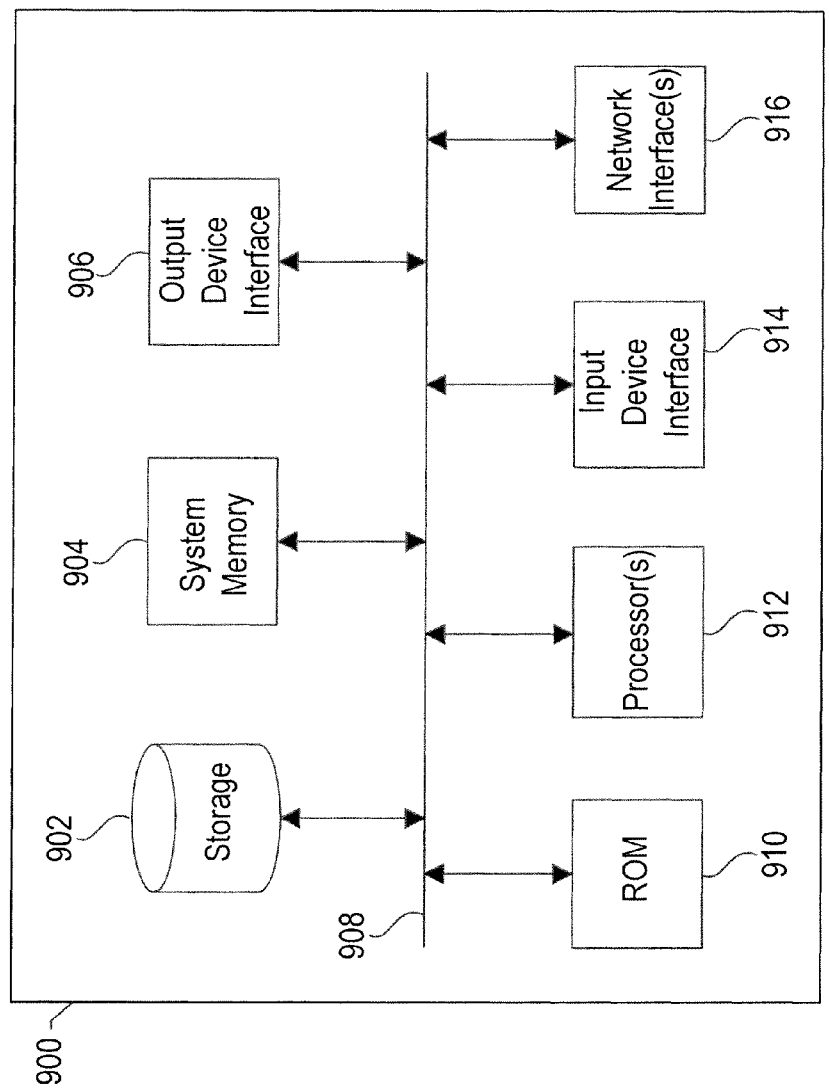
FIG. 9 conceptually illustrates an electronic system with which one or more implementations of the subject technology may be implemented.

FIG. 9 conceptually illustrates an electronic system 900 with which one or more implementations of the subject technology may be implemented. The electronic system 900, for example, can be a gateway device, a set-top box, a desktop computer, a laptop computer, a tablet computer, a server, a switch, a router, a base station, a receiver, a phone, a personal digital assistant (PDA), or generally any electronic device that transmits signals over a network. The electronic system 900 can be, and/or can be a part of, the network device 110, and/or one or more of the electronic devices 102A-C. Such an electronic system includes various types of computer readable media and interfaces for various other types of computer readable media. The electronic system 900 includes a bus 908, one or more processor(s) 912, such as the processor 206, a system memory 904 or buffer, a read-only memory (ROM) 910, a permanent storage device 902, an input device interface 914, an output device interface 906, and one or more network interface(s) 916, or subsets and variations thereof.

The bus 908 collectively represents all system, peripheral, and chipset buses that communicatively connect the numerous internal devices of the electronic system 900. In one or more implementations, the bus 908 communicatively connects the one or more processor(s) 912 with the ROM 910, the system memory 904, and the permanent storage device 902. From these various memory units, the one or more processor(s) 912 retrieve instructions to execute and data to process in order to execute the processes of the subject disclosure. The one or more processor(s) 912 can be a single processor or a multi-core processor in different implementations.

The ROM 910 stores static data and instructions that are needed by the one or more processor(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processor(s) 912 may need at runtime. In one or more implementations, the processes of the subject disclosure are stored in the system memory 904, the permanent storage device 902, and/or the ROM 910. From these various memory units, the one or more processor(s) 912 retrieve instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 9, bus 908 also couples electronic system 900 to one or more networks (not shown), one or more electronic devices 102A-C, and/or content server 112, through one or more network interface(s) 916. One or more network interface(s) may include an Ethernet interface, a WiFi interface, a multimedia over coax alliance (MoCA) interface, a reduced gigabit media independent interface (RGMII), or generally any interface for connecting to a network. In this manner, electronic system 900 can be a part of one or more networks of computers (such as a local area network ("LAN"), a wide area network ("WAN"), or an Intranet, or a network of networks, such as the Internet. Any or all components of electronic system 900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method of scalable and predictive packet processing, the method comprising:
    performing, by a processor, ingress packet processing on a first received packet having a predictive packet processing (PPP) flow identifier;
    storing one or more packet processing results of the ingress packet processing performed on the first received packet in a memory management unit; and
    performing a packet action on one or more subsequently received packets having the same PPP flow identifier as the first received packet, the packet action being a same action as that performed on the first received packet and being based on the stored one or more packet processing results of the first received packet,
    wherein the packet action and the one or more packet processing results are each independent of the PPP flow identifier.

2. The method of claim 1, wherein the packet action is performed without performing ingress packet processing on the subsequently received packets having the same PPP flow identifier as the first received packet.

3. The method of claim 1, further comprising:
    determining that the PPP flow identifier is to be trusted; and
    performing the packet action based on determining that a PPP flow identifier lookup is valid.

4. The method of claim 1, further comprising:
    determining that the PPP flow identifier is not to be trusted;
    deriving an alternate PPP flow identifier; and
    performing the packet action based on determining that an alternate PPP flow identifier lookup is valid.

5. The method of claim 4, wherein the alternate PPP flow identifier is derived based on source attributes and the PPP flow identifier.

6. The method of claim 4, wherein the PPP flow identifier is an external flow identifier and the alternate PPP flow identifier is an internal flow identifier.

7. The method of claim 1, wherein the packet action comprises forwarding the subsequently received packets to another device.

8. The method of claim 7, wherein the packet action further comprises editing the subsequently received packets.

9. The method of claim 1, wherein the first and subsequently received packets comprise a PPP tag.

10. The method of claim 9, wherein the PPP tag comprises a PPP ether-type field and a Flow-ID field.

11. The method of claim 1, wherein the first and subsequently received packets comprise a burst of packets over a dedicated ingress port.

12. The method of claim 11, wherein the first and subsequently received packets comprise a PPP tag comprising a PPP ether-type field, a count value field and a count reset field.

13. The method of claim 12, further comprising:
    determining that a counter has not been reset; and
    performing the packet action based on determining that a per-port count is not zero.

14. The method of claim 12, wherein the PPP tag further comprises at least one of a byte count and a time interval.

15. The method of claim 14, wherein the PPP tag is used to predictively apply one or more actions for a next set of incoming packets.

16. A system for providing predictive packet processing, the system comprising:
    an ingress packet processor circuit configured to perform ingress packet processing on a first received packet having a predictive packet processing (PPP) tag comprising a PPP flow identifier, pass one or more packet processing results of the ingress packet processing performed on the first received packet to a memory management unit circuit, pass the first received packet to an egress packet processor circuit, and pass subsequently received packets having PPP tags with the same PPP flow identifier as the first received packet to the egress packet processor circuit;

the memory management unit circuit configured to store the one or more packet processing results of the ingress packet processing performed on the first received packet; and the egress packet processor circuit configured to perform a packet action on the passed subsequently received packets based on the one or more packet processing results stored in the memory management unit circuit, the packet action being a same action as that performed on the first received packet and the ingress packet processing being bypassed for the passed subsequently received packets, wherein the packet action and the one or more packet processing results are each independent of the PPP flow identifier.

17. The system of claim 16, wherein the ingress packet processor circuit is further configured to pass the subsequently received packets having PPP tags with the same PPP flow identifier as the first received packet to the egress packet processor circuit without performing ingress packet processing.

18. The system of claim 16, wherein the first and subsequently received packets are received as a burst of packets over a dedicated link, and wherein the ingress packet processor circuit is further configured to pass the subsequently received packets to the egress packet processor circuit without performing ingress packet processing based on a count value.

19. A computer program product comprising instructions stored in a non-transitory computer-readable storage medium, the instructions comprising:

instructions for performing ingress packet processing on a first packet of a plurality of incoming packets having a predictive packet processing (PPP) tag comprising a PPP flow identifier, the incoming packets being received over one or more ingress ports of a network device;

instructions for storing one or more packet processing results of the ingress packet processing performed on the first packet in a memory management unit; and instructions for performing a packet action on one or more subsequent incoming packets having the same PPP tag flow identifier as the first packet, the packet action being included in the stored one or more packet processing results and the packet action being a same action as that performed on the first packet, wherein the packet action and the one or more packet processing results are each independent of the PPP flow identifier.

20. The computer program product of claim 19, wherein the packet action is performed without performing ingress packet processing on the one or more subsequent incoming packets.

21. The method of claim 1, wherein the stored one or more packet processing results indicate a device to which the first received packet was forwarded and the packet action comprises forwarding the one or more subsequently received packets to the device.

22. The method of claim 1, wherein the stored one or more packet processing results identify the packet action that comprises editing the first received packet.

* * * * *